(12) United States Patent
Christian et al.

(10) Patent No.: US 8,180,767 B2
(45) Date of Patent: *May 15, 2012

(54) INFERRED RELATIONSHIPS FROM USER TAGGED CONTENT

(75) Inventors: Brian S. Christian, Redmond, WA (US); Aston Motes, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/687,656

(22) Filed: Jan. 14, 2010

(65) Prior Publication Data

US 2010/0114881 A1 May 6, 2010

Related U.S. Application Data

(63) Continuation of application No. 11/315,516, filed on Dec. 22, 2005, now Pat. No. 7,664,760.

(51) Int. Cl.
*G06F 17/00* (2006.01)
(52) U.S. Cl. ........................................ 707/723; 707/954
(58) Field of Classification Search .................. 707/723, 707/954
See application file for complete search history.

(56) References Cited

U.S. PATENT DOCUMENTS

| | | | |
|---|---|---|---|
| 6,564,206 B1 * | 5/2003 | Ikeda | 707/722 |
| 6,606,619 B2 * | 8/2003 | Ortega et al. | 1/1 |
| 7,167,866 B2 * | 1/2007 | Farnham et al. | 1/1 |
| 2004/0122790 A1 * | 6/2004 | Walker et al. | 707/1 |
| 2004/0156535 A1 * | 8/2004 | Goldberg et al. | 382/115 |
| 2005/0091184 A1 * | 4/2005 | Seshadri et al. | 707/1 |
| 2005/0192957 A1 * | 9/2005 | Newbold | 707/5 |
| 2005/0234952 A1 * | 10/2005 | Zeng et al. | 707/101 |

* cited by examiner

*Primary Examiner* — Mohammad Ali
*Assistant Examiner* — John Hocker
(74) *Attorney, Agent, or Firm* — Shook, Hardy & Bacon L.L.P.

(57) ABSTRACT

A tagged content inference system and method is provided. The system facilitates browsing of content with a pseudo-hierarchical feel using algorithmically-deduced relationships between items based on user applied tags. Based, at least in part, upon tagged content, an inference component can infer relationships between items (e.g., creating a pseudo-hierarchy) in order to facilitate browsing of the items.

The system can further include a relationship display component that can provide a visual representation of tagged items based on relationship(s) inferred by the inference component. The visual representation can further be based, at least in part, upon user input (e.g., threshold quantity of tags to be displayed, threshold strength of relationship, color setting(s), etc.).

19 Claims, 9 Drawing Sheets

INFERRED RELATIONSHIPS FROM USER TAGGED CONTENT

RELATED APPLICATIONS

This application is a continuation of and claims benefit of priority to U.S. patent application Ser. No. 11/315,516, filed on Dec. 22, 2005, which application is herein incorporated by reference.

BACKGROUND

The amount of data available to information seekers has grown astronomically, whether as the result of the proliferation of information sources on the Internet, or as a result of private efforts to organize business information within a company, or any of a variety of other causes. As the amount of available data grows, so does the need to be able to categorize or label that data so that the data may be more efficiently searched. One approach is to use tagging for this task.

Tagging is the process of adding or attaching metadata such as descriptive attributes to a data object. A tag may be thought of as a category name. As used herein, a data object may be any type of data (e.g., a website, a text file, an image or a Word document). Operating systems, search mechanisms and filtering mechanisms may utilize tags to organize, sort or filter data objects. A taxonomy or system of classification may be defined by a set of tags and their relationships.

Tagging has become prevalent on the Internet as a means for organizing, and identifying relevant websites, articles and other data objects. Internet services allow users to apply tags to websites, photographic images, articles and the like. Tagging provides users with the ability to classify data objects both for their own use and for use by others. Popular web sites such as Flickr™ and del.icio.us allow users to tag and share photographic images and websites with communities of users.

Tagging is also useful within the context of a single client and allows the user to organize data within the client. For example, a user may store a collection of photographic images on the client. The user may apply the tag "vacation" to photographs taken while on holiday and "graduation" to photographs from graduation day. By sorting the photographs by the tags, the user is able to retrieve the appropriate photographs quickly and efficiently without having to view irrelevant and/or unwanted photographs.

In general, a user may use one or more taxonomies for various websites or web services and a separate taxonomy or taxonomies for a client computer. However, utilizing separate taxonomies makes it difficult for the user to maintain consistent organization of relevant data objects. Slight variations in tag names may result in users being unable to locate relevant information. For example, a user may apply the tag "vacation" to data objects stored on the client computer. Similar, relevant data objects may be tagged "vacation_Paris" or "vacation_2005" in a taxonomy on an Internet service. A search on the Internet service for those similar data objects utilizing the user's "vacation" tag will most likely fail to locate those relevant data objects.

In addition, inconsistent taxonomies make it more difficult to share data objects and a data object with a unique tag is less likely to be found by other users. A data object with tags that are consistent with the taxonomy used by an Internet service or a group is much more likely to be located and used by others than a data object with unique tags. Moreover, a given taxonomy becomes more valuable as more data objects are tagged within the given taxonomy. As the number of participants utilizing a particular taxonomy increases, the volume and variety of the data objects retrievable using that taxonomy tends to increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A tagged content inference system and method is provided. The system facilitates browsing of content with a pseudo-hierarchical feel using algorithmically-deduced relationships between items based on user applied "tags" (e.g., a user defined keyword that is applied to a piece of content as metadata). The system can employ these tags to allow for a natural feeling browse activity, based on the relationships of these tags and items (e.g., posts).

The system does not impose or derive a true hierarchy from the collections of tagged content. Instead, the system infers relationship between tagged content. Thus, rather than expecting user(s) to adhere to a predefined set of hierarchical categories, the system allows user(s) to view those item(s) that are "more" or "less" like the current context they are viewing. The system can thus enhance the browse ability, and therefore, discoverability of content. By leveraging the relationships that exist in "tag-space" in unique ways, users can discover content that is related to each other (e.g., in a way that makes sense to the users of the content itself).

Based, at least in part, upon the tagged content, an inference component can infer relationships between items (e.g., creating a pseudo-hierarchy) in order to facilitate browsing of the items. The inference component can employ one or more algorithms in order to infer relationships between tagged items. For example, to infer relationships, the inference component can determine a quantity of coincident tags, employ a Bayesian classifier style of categorization and/or calculate importance tags with respect to a focus tag.

The system can further include a relationship display component that can provide a visual representation of tagged items based on relationship(s) inferred by the inference component. The visual representation can further be based, at least in part, upon user input (e.g., threshold quantity of tags to be displayed, threshold strength of relationship, color setting(s), etc.)

For example the visual representation can employ "context", which is essentially a set of tags combined to produce a list of tagged content related to those tags. The user is able to change the content presented to them by modifying their context. That is, to be viewing a certain context can also be viewed as being centered around that tag set within the tag/question space.

The most basic change of context is selecting a new tag. In one example, the system brings a list of questions with the particular tag attached. From here, users may be interested in not only changing context by selecting a new tag to center around, but may also be interested in two different directions of hierarchical-style browsing. The first of these "digging down" into the hierarchy, resulting in fewer questions as if under a more specific hierarchy element. The second is going "out in scope," to broaden the view as if moving to a higher hierarchy element, leading to more questions shown in the current context.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
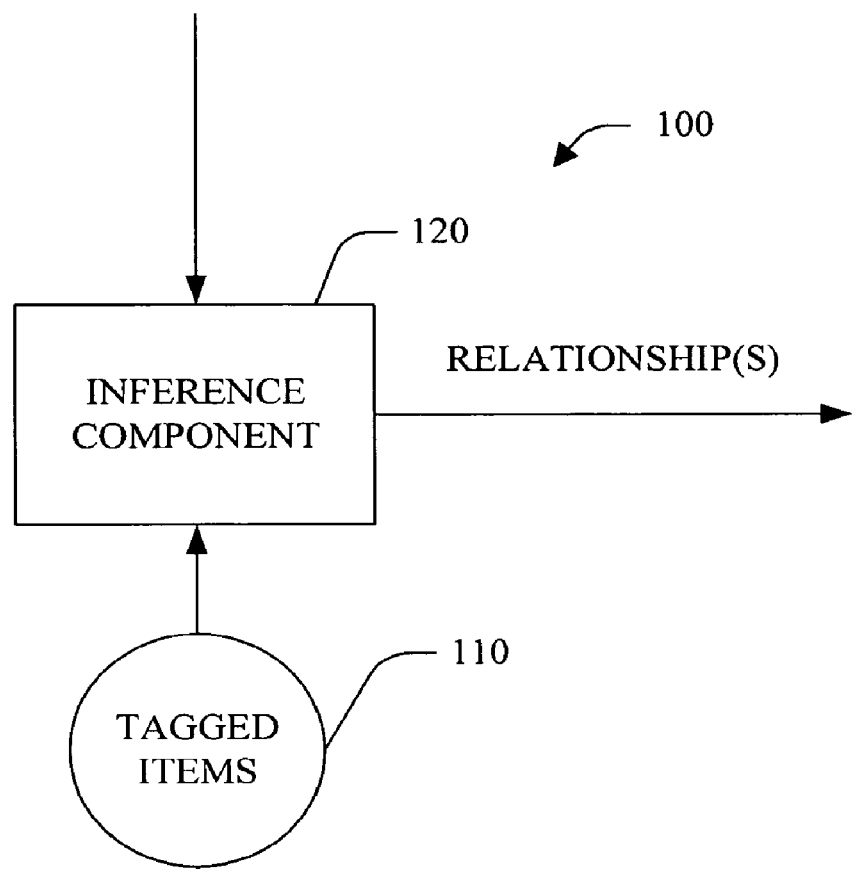
FIG. 1 is a block diagram of a tagged content inference system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Additionally, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Thus, in one example, based at least in part upon user context (e.g., geographic location of a user, applications running on a computer, . . . ), an association between extracted data and associated text may be made.

Referring to FIG. 1, a tagged content inference system 100 is illustrated. The system 100 facilitates browsing of content with a pseudo-hierarchical feel using algorithmically-deduced relationships between items based on user applied "tags". As used herein, the term "tag" refers to a user defined keyword that is applied to a piece of content as metadata. For instance an item can be a posted question about dining out in Seattle may contain tags such as "Dining", "Waterfront" and "Italian" to allow for easy search and retrieval of this item (e.g., post) by other users. The system 100 can employ these tags to allow for a natural feeling browse activity, based on the relationships of these tags and items (e.g., posts).

Conventional systems have applied a classic taxonomy to large collections of data which generally does not work out in actual implementation. Too often the miscellaneous category gets overloaded, and/or the hierarchy of the taxonomy becomes so deep as to become more overhead than benefit.

The system 100 does not impose or derive a true hierarchy from the collections of tagged content 110. Instead, the system 100 infers relationship between tagged content 110. Thus, rather than expecting user(s) to adhere to a predefined set of hierarchical categories, the system 100 allows user(s) to view those item(s) that are "more" or "less" like the current context they are viewing. The system 100 can thus enhance the browse ability, and therefore, discoverability of content. By leveraging the relationships that exist in "tag-space" in unique ways, users can discover content that is related to each other (e.g., in a way that makes sense to the users of the content itself).

For example, the system 100 can be employed to classify questions and, optionally, corresponding answers, that are posted in such a way as to be easily found, grouped and browsed. The content (e.g., questions and/or answers) can be tagged by individual user(s) in such a way as to classify it in the manner that most represents the community's perspective on the content itself—"folksonomy". In one example, any user can tag any content at anytime. In another example, only the originator of the content can add tag(s). While folksonomy(ies) do a good job of allowing the community to define the extent and the precision of their classification, they do not provide any form of hierarchy; they are essentially flat. Based, at least in part, upon the tagged content 110, an inference component 120 can infer relationships between items (e.g., creating a pseudo-hierarchy) in order to facilitate browsing of the items.

The inference component 120 can employ one or more algorithms in order to infer relationships between tagged items 110. For example, the inference component 120 can employ an algorithm that scores each potential tag for auto suggesting by giving it a point for each time it has been used with one of the tags currently attached to a focus item (e.g., coincident tag(s)). Those with the highest number of points are the "best" tags for auto suggestion. Choosing out of the list of potential tags which ones are likely auto suggests can be accomplished using statistical analysis. For example, calculations on the number of standard deviations away from the mean (the z-score), where item(s) more than two standard deviations away are especially popular and should be auto suggested. This algorithm can give users a way to browse very popular and potentially relevant item(s).

In another example, the inference component 120 can employ a Bayesian classifier style of categorization. In this example, the inference component 120 basically computes the probability of each of the current tags on a question occurring with the potentially auto suggestible tag as well as the probability of the potentially auto suggestible tag appearing on a question in general, then finds the probability that all of these events happen simultaneously. The inference component 120 can employ the probabilities to produce relationships based on ranking.

In yet a third example, as discussed above, the inference component 120 can scores each potential tag for auto suggesting by giving it a point for each time it has been used with one of the tags currently attached to a focus item. Those with the highest number of points are the best tags for auto suggestion.

In a fourth example, an importance score for tags can be calculated with respect a focus tag (e.g., central tag). In this example, the a calculation is performed to determine percentage of links from the central tag which went to each related tag, with the ones having a larger share being deemed of higher importance. This technique can be employed for a concentric circle display, as discussed in greater detail below. Interestingly, the importance score is asymmetric. For example, in the world of <microsoft> (as the focus tag), <sharepoint> makes up a minuscule percentage of the links. Meanwhile, in the world of <sharepoint>, <microsoft> has a nearly 100% share (<sharepoint> is never used with any other tags). The conclusion that could be drawn given these facts is that in a hierarchy created with these tags, <sharepoint> would certainly fall under <microsoft>, and never vice-versa.

While four algorithms have been discussed, those skilled in the art will recognize that the inference component 120 can employ any suitable inference algorithm for inferring relationship between tagged items 110. All such inference algorithms are intended to be encompassed by the hereto appended claims.

The inference component 120 can, optionally, receive user feedback with respect to the inferred relationship(s). The inference component 120 can use the feedback when inferring relationship (e.g., adapt an inference model).

Figure 2:
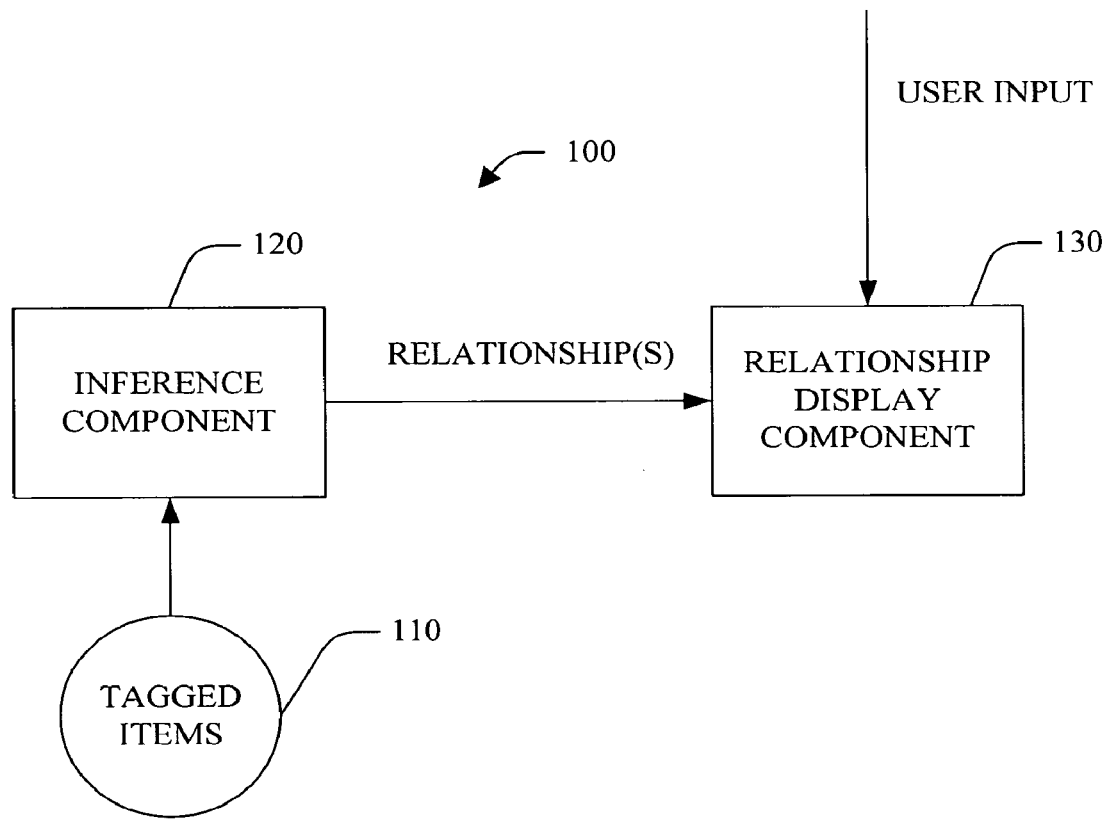
FIG. 2 is a block diagram of a tagged content inference system.

Turning to FIG. 2, the system 100 can, optionally, include a relationship display component 130. The relationship display component 130 can create a visual representation of tagged items 110 based on relationship(s) inferred by the inference component 120. The visual representation can further be based, at least in part, upon user input (e.g., threshold quantity of tags to be displayed, threshold strength of relationship, color setting(s), etc.)

For example the visual representation can employ "context", which is essentially a set of tags combined to produce a list of tagged content related to those tags. It is, in the end, this tagged content through which users are browsing. The user is able to change the content presented by modifying the user's context. To be viewing a certain context can also be viewed as being centered around that tag set within the tag/question space.

The most basic change of context is selecting a new tag. In one example, the system 100 brings a list of questions with the particular tag attached. From here, users may be interested in not only changing context by selecting a new tag to center around, but may also be interested in two different directions of hierarchical-style browsing. The first of these is "digging down" into the hierarchy, resulting in fewer questions as if under a more specific hierarchy element. The second is going "out in scope," to broaden the view as if moving to a higher hierarchy element, leading to more questions shown in the current context.

Figure 3:
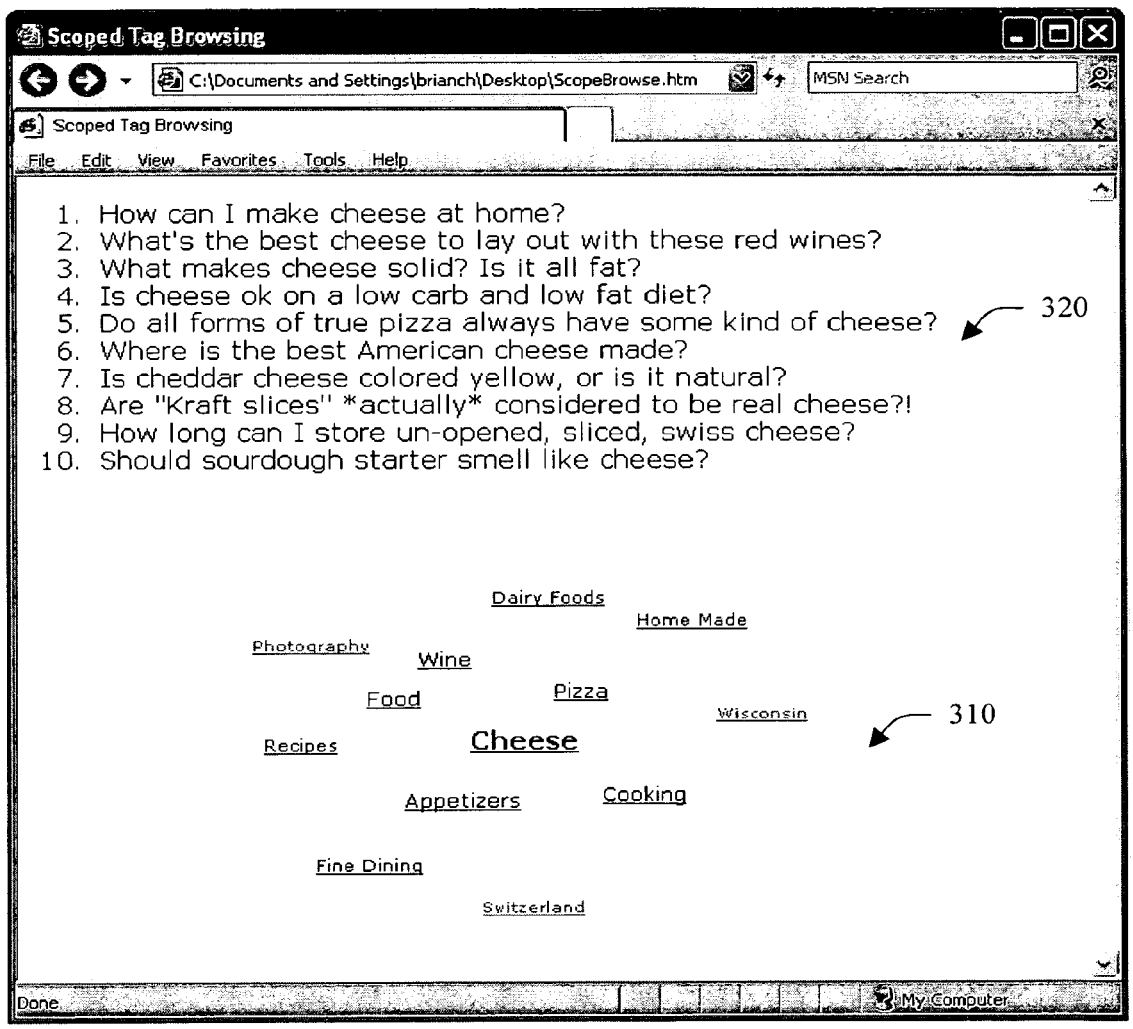
FIG. 3 is an exemplary user interface.

Briefly turning to FIG. 3, an exemplary user interface 300 is illustrated. The user interface 300 includes a tag inferred relationship display area 310 and a post area 320. In the example of FIG. 3, a user can go from "cheese", out in scope (or "up in hierarchy") to "food" then choose to click on "recipes" to alter the user's current context, then "home canning" and find content that still somewhat relates to home food processing, but would otherwise not have any form of relationship in a fixed hierarchy. This browsing, though user initiated, is based, at least in part, upon the relationships between tags inferred by the inference component 120. Thus, the system 100 can facilitate the intelligent and intuitive presentation of tags related to the current context (e.g., focus tag) such that browsing in a hierarchical fashion is experienced, even though the actual data is categorized in a completely flat way.

Additionally, as illustrated in FIG. 3, the relationship display component 130 can add another dimension to the tag inferred relationship display area 310—distance from the current context (e.g., due to the potentially large quantity of related tags). For example, wine and photography are both related to the word "cheese," but the latter is much farther separated in general than the former, as many questions about wine involve cheeses to be sampled, but very few photography questions ever question why the phrase "cheese" is often said as a picture is taken.

Figure 4:
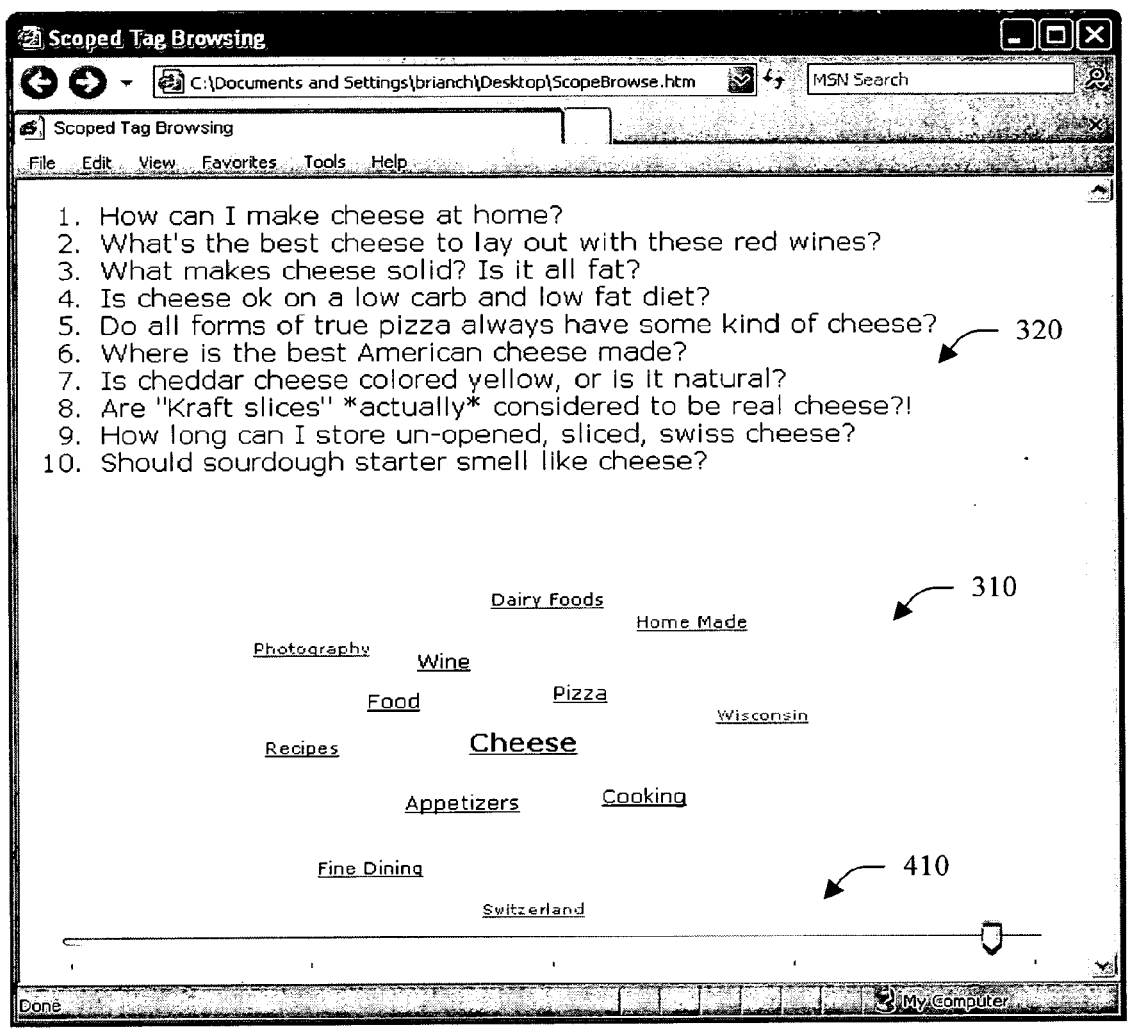
FIG. 4 is an exemplary user interface.

Referring briefly to FIG. 4, an exemplary user interface 400 is illustrated. In addition to the tag inferred relationship display area 310 and the post area 320, the user interface 400 includes a control 410 which can be employed by a user to adjust how closely related to the center context (e.g., focus tag) displayed results are to be included (e.g., a threshold for inferred relationships to be displayed). In this example, the control 410 is a slider style control; however, any suitable control can be employed. Thus, with the user interface 400, the user can re-center their context (e.g., select a particular tag as the "new" focus" and narrow and/or widen the scope of the tag sets directly on the display to allow a more or less narrowly focused scope.

Figure 5:
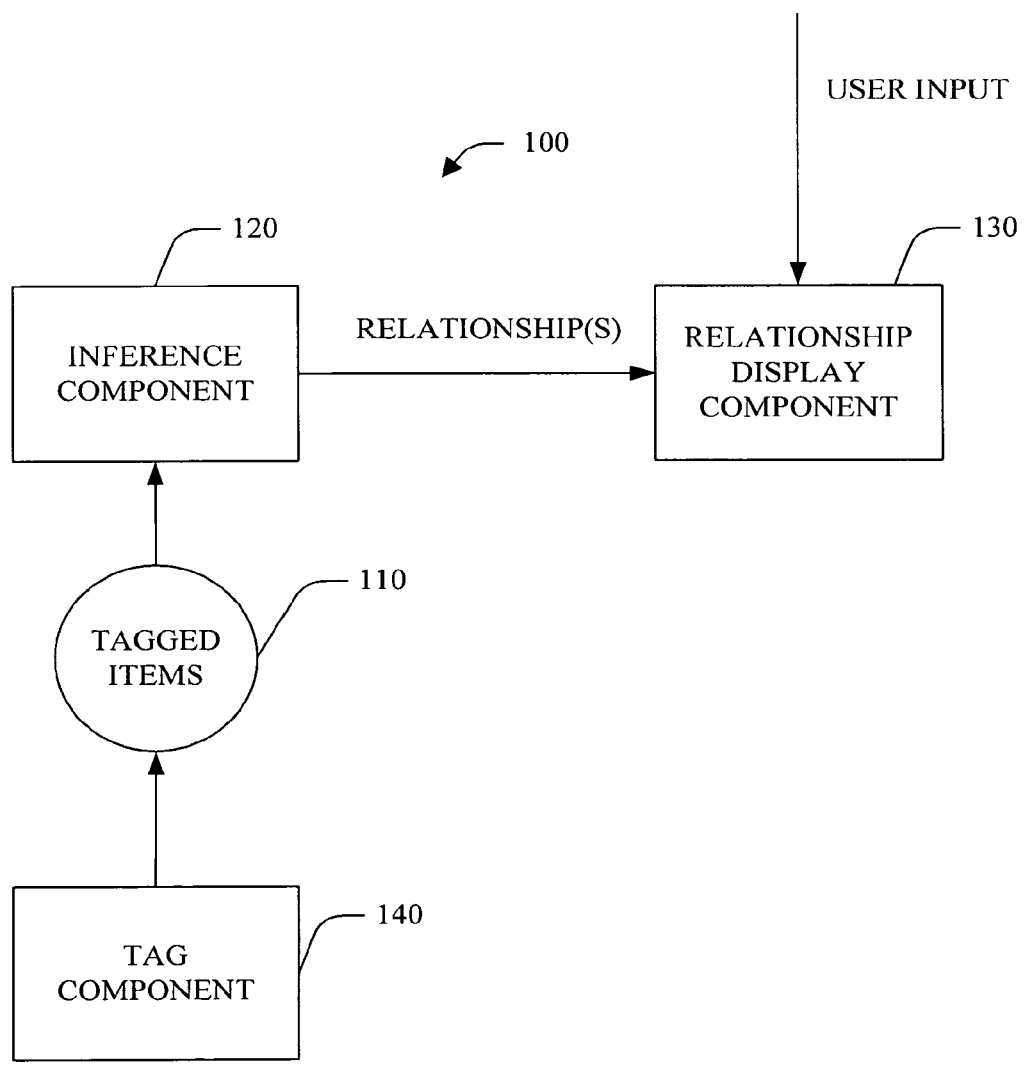
FIG. 5 is a block diagram of a tagged content inference system.

Turning to FIG. 5, the tagged content inference system 100 can further, optionally, include a tag component 140 which can be employed by a user to tag item(s). In one example, a user can enter one or more keywords associated with a particular item into an input box. The keywords are then attached to the item as a tag (e.g., metadata). In another example, a user is presented with a user interface which provides tag selections for the user to identify with the item (e.g., text/combo box).

It is to be appreciated that the system 100, the tagged items 110, the inference component 120, the relationship display component 130 and/or the tag component 140 can be computer components as that term is defined herein.

Figure 6:
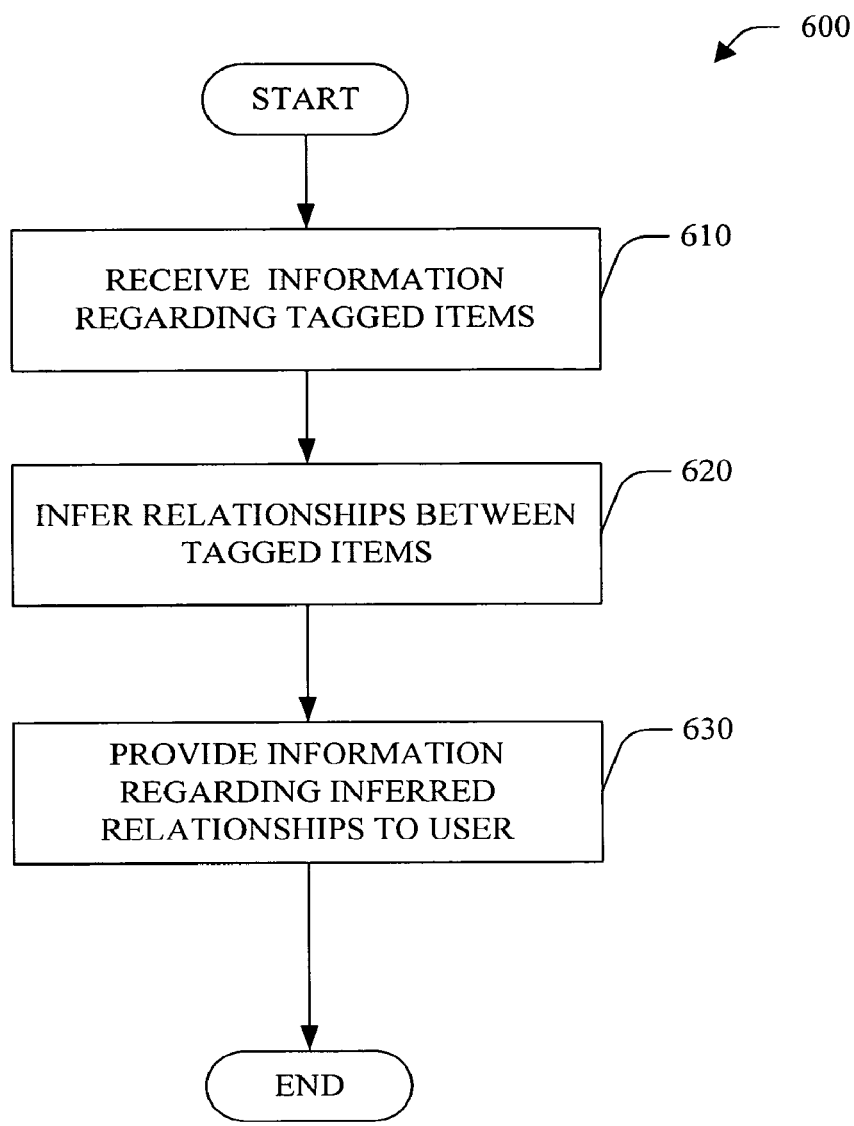
FIG. 6 is a flow chart of a tagged content inference method.
Figure 7:
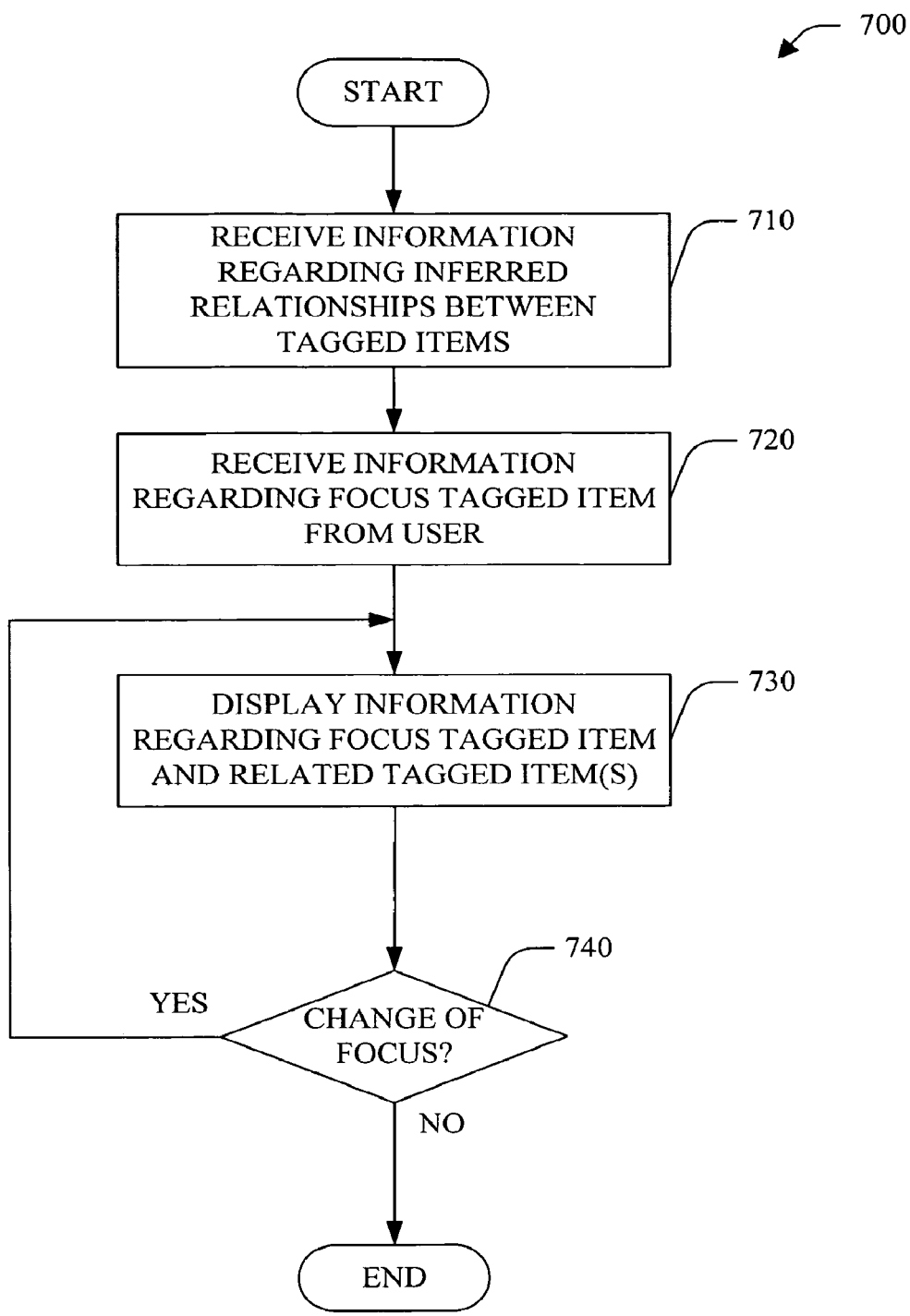
FIG. 7 is a flow chart of an inferred relationship display method.

Turning briefly to FIGS. 6 and 7, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a tagged content inference method 600 is illustrated. At 610, information regarding tagged items is received. At 620, relationships between tagged items are inferred. At 630, information regarding the inferred relationships is provided to a user.

Next, turning to FIG. 7, an inferred relationship display method 700 is illustrated. At 710, information regarding inferred relationships between tagged items is received. At 720, information regarding a focus tagged item is received from a user. At 730, information regarding the focus tagged item and related tagged item(s) is displayed to the user. At 740, a determination is made as to whether the focus has changed. If the determination at 740 is YES, processing continues at 730. If the determination at 730 is NO, no further processing occurs.

Figure 8:
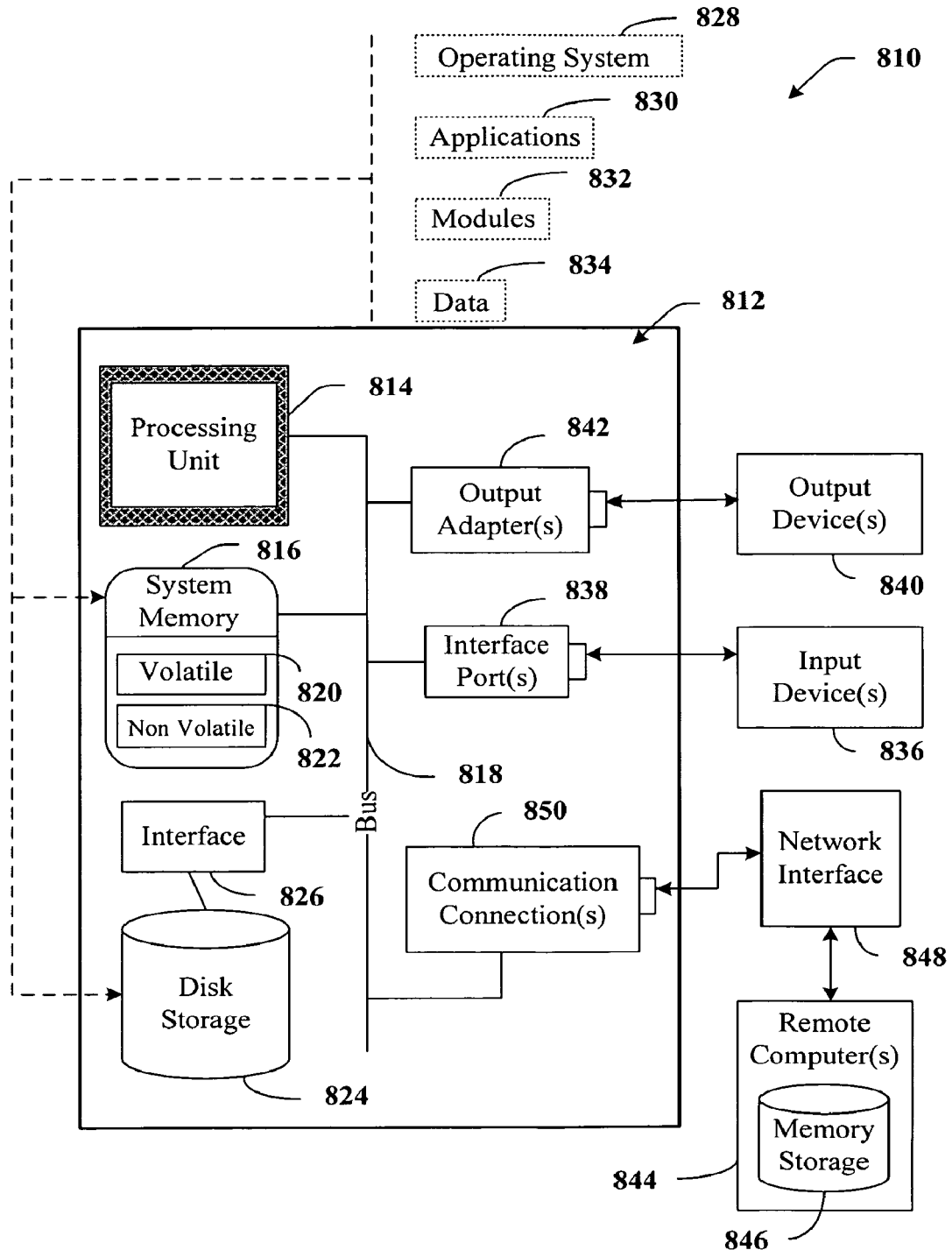
FIG. 8 illustrates an example operating environment.

In order to provide additional context for various aspects of the claimed subject matter, FIG. 8 and the following discussion are intended to provide a brief, general description of a suitable operating environment 810. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
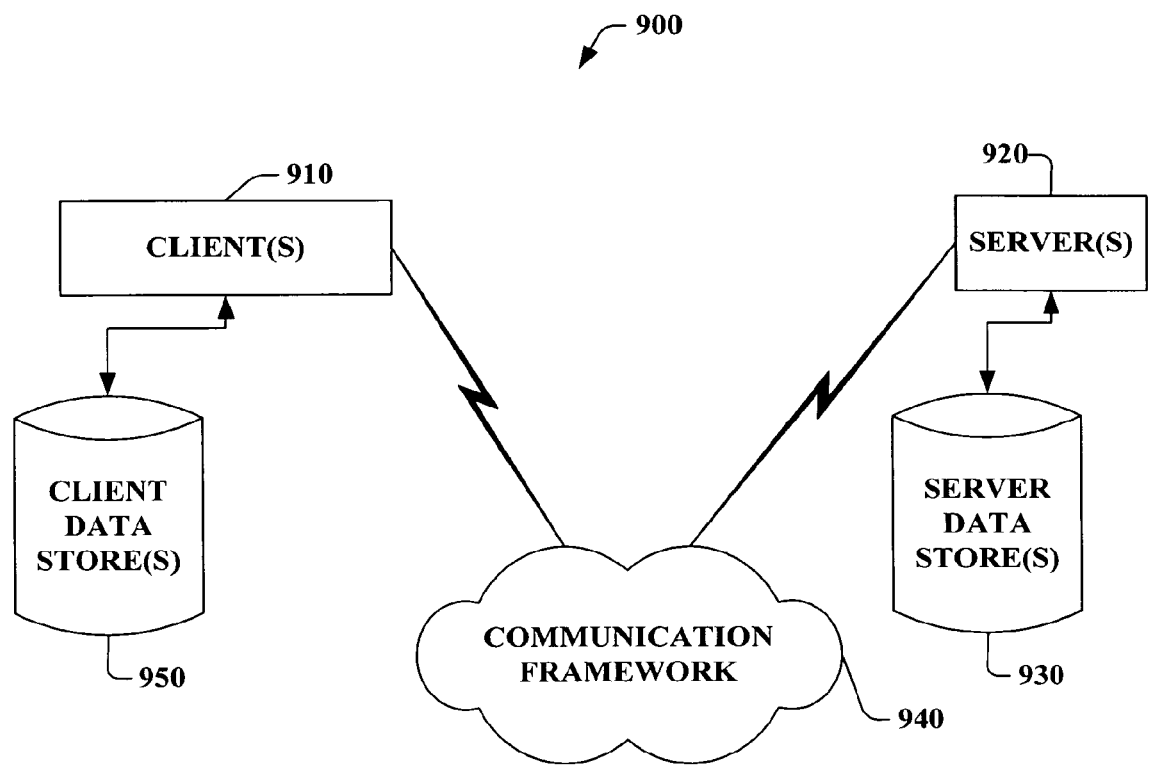
FIG. 9 illustrates an exemplary networking environment.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for presenting a content according to relationships inferred from tags associated with the content, the method comprising:
   accessing, at a computing device, a set of tagged items and inferring relationships between tags associated with the tagged items,
   wherein a tag is metadata that describes an attribute of an item;
   receiving a selection of a user selected tag;
   identifying a set of potentially suggestible tags based upon a statistical analysis of the potentially suggestible tags and the user selected tag;
   calculating an importance score for each potentially suggestible tag with respect to the user selected tag; and
   displaying an inferred-relationship display area and a post area,
   wherein the inferred-relationship display area is a visual representation of the user selected tag surrounded by related tags that are determined to be related to the user selected tag,
   wherein a closeness of an inferred relationship between the user selected tag and a tag within the related tags is determined using the importance score and is illustrated by a distance between where the user selected tag is displayed and where the tag within the related tags is displayed,
   and wherein a shorter distance indicates a closer relationship, and
   wherein the post area displays a plurality of posts associated with the related tags.

2. The method of claim 1, wherein the relationship strength is inferred based on the number of items each tag is coincident with the user selected tag, wherein a higher number indicates a stronger relationship and a lower number indicates a weaker relationship.

3. The method of claim 2, further comprising determining the tags to display based upon relationship strength being above a user specified or statistically computed threshold.

4. The method of claim 3, wherein the subset of tagged items displayed is based upon the tags determined from the threshold.

5. The method of claim 2, further comprising employing an algorithm that infers a relationship between a tag and the user selected tag based upon a probability that the tag is attached to an item compared to a probability that the user selected tag is attached to an item.

6. The method of claim 1, further comprising employing a Bayesian classifier to infer relationships between items.

7. The method of claim 6, wherein said inferring relationships is based upon computing a probability of each tag associated with a currently selected item occurring with a potential suggestible tag, a probability of the potential suggestible tag being associated with any item and, a probability of each current tag occurring with the potential suggestible tag, and the potential suggestible tag being associated with the item simultaneously.

8. The method of claim 7, wherein said inferring relationships includes inferring for items having the probability of said each current tag occurring with the potential suggestible tag and potential suggestible tag being associated with the item simultaneously above a particular threshold.

9. The method of claim 1, wherein each of the related tags displayed in the inferred-relationship display area is selectable by a user, and wherein a related tag becomes a new user selected tag upon a user selecting the related tag.

10. The method of claim 1, further comprising ranking potential suggestible tags based on the calculated importance scores with greater importance scores used to infer stronger relationships.

11. The method of claim 1, further comprising receiving user feedback with respect to inferred relationships and employing the feedback in further inferring relationships between tagged items.

12. The method of claim 1, wherein the visual representation is based, at least in part upon user input, the user input comprising at least one of a threshold quantity of tags to be displayed or a threshold strength of relationship to be displayed.

13. The method of claim 1, further comprising, upon user selection of a related tag, displaying a new visual representation of new tagged items that are associated with tags related to the related tag.

14. The method of claim 1, wherein the visual representation of the related tags is user browsable in at least two directions.

15. The method of claim 1, the visual representation comprising the user selected tag and the related tags, the related tags displayed in concentric circles around the user selected tag with each tag a distance from the user selected tag that is based on a strength of the inferred relationship between a particular related tag and the user selected tag.

16. An inferred relationship display method, comprising:
inferring, at a computing device, relationships between tags associated with tagged items,
wherein a tag is metadata that describes an attribute of an item;
receiving information regarding a tag on which to focus from a user;
identifying a set of potentially suggestible tags based upon a statistical analysis of the potentially suggestible tags and the tag;
calculating an importance score for each potentially suggestible tag with respect to the tag; and
displaying an inferred-relationship display area that is a visual representation of the tag surrounded by a plurality of related tags that are related, by an inferred relationship with the tag,
wherein a closeness of an inferred relationship between the tag and an individual tag within the plurality of related tags is based on the importance score and is illustrated by a distance between where the tag is displayed and where the individual tag is displayed,
and wherein a shorter distance indicates a closer relationship; and,
displaying a post area that includes a plurality of posts associated with the related tags.

17. The method of claim 16, further comprising:
receiving a selection of a new tag on which to focus from the user, wherein the new tag is a new context;
displaying a new visual representation of the post area and a new inferred-relationship display area based on the new context, wherein a new plurality of posts associated with the new tag are displayed in the new visual representation of the post area.

18. A method of displaying items related to a user selected tag, comprising:
inferring, at a computing device, relationships between tags associated with tagged items,
wherein a tag is metadata that describes an attribute of an item;
receiving a selection of a tag on which to focus from a user;
identifying a set of potentially suggestible tags based upon a statistical analysis of the potentially suggestible tags and the tag;
calculating an importance score for each potentially suggestible tag with respect to the tag; and
displaying a post area and an inferred-relationship display area,
wherein the post area displays representations of a subset of the tagged items that are related to the tag,
wherein the inferred-relationship display area displays a representation of a group of tags related to the tag,
wherein the group of tags only includes tags with above a threshold of relational closeness as determined by the importance score,
wherein tags within the group of tags displayed in the inferred-relationship display area are selectable by a user,
and wherein a related tag becomes a new user selected tag upon a user selecting the related tag.

19. The method of claim 18, further comprising:
displaying a control for the user to change the threshold of relational closeness;
receiving an input from the user through the control that increases the threshold of relational closeness; and
updating the group of tags to include only those tags that satisfy an increased threshold of relational closeness.

* * * * *